United States Patent [19]
Epstein

[11] Patent Number: 5,680,193
[45] Date of Patent: Oct. 21, 1997

[54] POSITIONING DEVICE FOR EYEGLASSES HAVING BIFOCAL LENSES

[76] Inventor: Harry Epstein, 49 B Otis St., West Babylon, N.Y. 11704

[21] Appl. No.: 607,336

[22] Filed: Feb. 26, 1996

[51] Int. Cl.⁶ .................................................. G02C 7/06
[52] U.S. Cl. ............................................................ 351/55
[58] Field of Search ............................. 351/41, 54, 55, 351/78, 79, 136, 158; 2/446

[56] References Cited

U.S. PATENT DOCUMENTS 2,801,569  8/1957  Ralph ........................................ 351/55
3,087,383  4/1963  Ralph ........................................ 351/55

Primary Examiner—Huy Mai
Attorney, Agent, or Firm—Lackenbach Siegel Marzullo Aronson & Greenspan, P.C.

[57] ABSTRACT

A device positioned on the nose of a wearer of eyeglasses with bifocal lenses having the lens lower parts corrected for near vision. The device includes a housing that defines a nose cavity having an inner surface defining a matrix for receiving the upper nose portion of the nose of the wearer of the eyeglasses. The housing positions the lens bridge above the nose of the wearer so that the bifocal lenses are also raised relative to the eyes of the wearer, whereby when the sight lines of the wearer are directed in a generally horizontal direction, the sight lines are aligned through the lens lower parts. The housing includes a convex surface for supporting the lens bridge and the inner sides of the two lens rims. A keeper structure connected to the housing holds the eyeglasses in position relative to the housing.

8 Claims, 2 Drawing Sheets

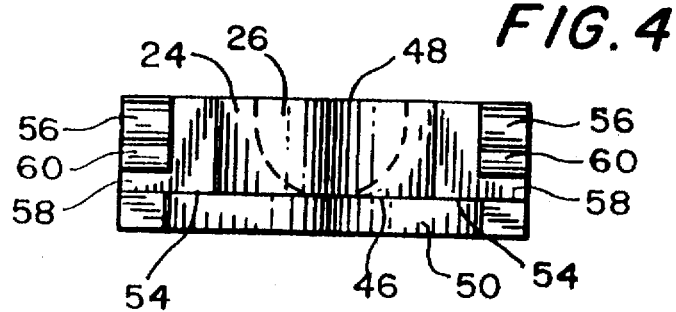
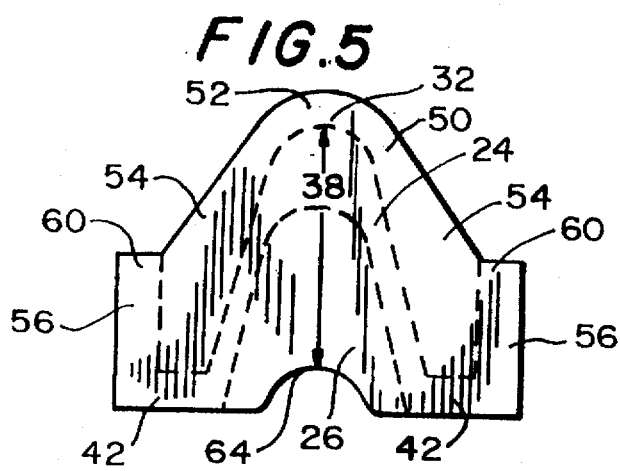
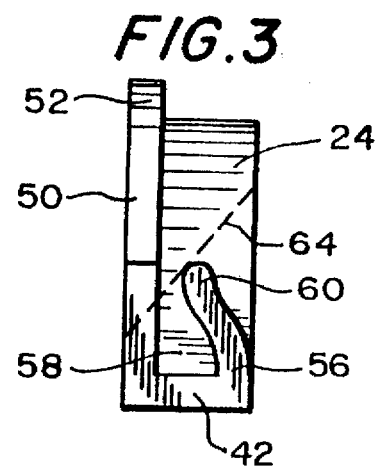
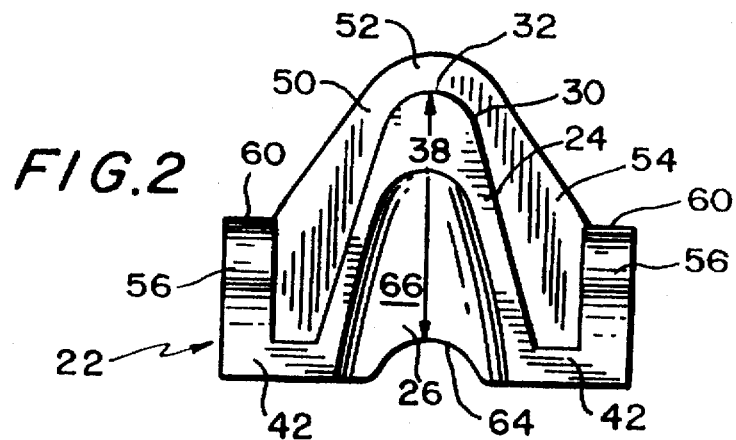
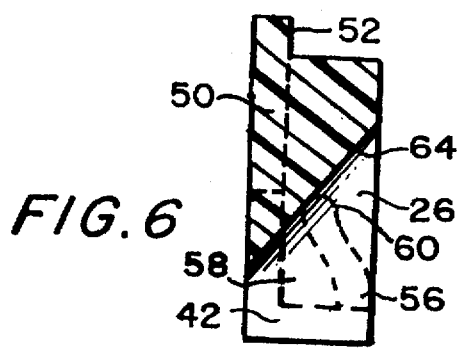

5,680,193

POSITIONING DEVICE FOR EYEGLASSES HAVING BIFOCAL LENSES

FIELD OF THE INVENTION

This invention relates generally to the field of eyeglasses and more particularly to a device that aligns the sight lines of a wearer of eyeglasses having bifocal lenses.

BACKGROUND OF THE INVENTION

Users of computers direct their vision in a generally horizontal direction in order to view the monitor, which requirement causes difficulties for wearers of eyeglasses provided with bifocal lenses. Each bifocal lens is provided with two focal lengths, one part that corrects for near vision, that is, for reading vision for far-sighted people; and another part that is either uncorrected or is corrected for distant vision. The lower, near-vision part enables a farsighted user to read printed material in a normal reading position with the wearer's sight lines aligned in a generally downward direction through the magnified bottom parts of the eyeglasses. The head of a wearer of bifocal eyeglasses who is using a computer monitor has to be tilted slightly backwards in order to direct the lines of sight through the bottom parts of the bifocal lenses so that focus can be accomplished at the monitor screen. Such a head tilt creates strain on the neck of the wearer.

SUMMARY OF THE INVENTION

It is therefore an object of the present invention to provide a device that when used in combination with eyeglasses with bifocal lenses, the sight lines of the wearer of the eyeglasses are aligned through the lower parts of the lenses when the sight lines are directed in a generally horizontal direction at a monitor screen.

It is another object of the present invention to provide a device that can be placed upon the nose of a wearer of eyeglasses; and that when used in combination with eyeglasses with bifocal lenses, the eyeglasses are raised upwardly to a certain distance with the result that the lower parts of the bifocal lenses are also raised upwardly so that the sight lines of the wearer are aligned through the lower parts of the lenses when the sight lines are directed in a generally horizontal direction at a monitor screen.

In accordance with this and other objects that will become apparent in the course of this disclosure, there is provided a device positioned on the nose of a wearer of eyeglasses with bifocal lenses having the lower parts of the bifocal lenses corrected for near vision. The device includes a housing that defines a nose cavity that receives the upper nose of the nose of the wearer. The housing forms a convex surface that supports the lens bridge of the eyeglasses and the rims inner sides of the pair of lens rims. The convex surface has an apex that is positioned directly above the nose cavity at a distance, which is generally approximately one inch, which is the distance that the lens bridge is raised above the nose of the wearer so that the eyeglass lenses are also raised about one inch relative to the eyes of the wearer. Thus, when the sight lines of the wearer are directed in a generally horizontal direction, the sight lines are aligned through the lower parts of the bifocal lenses.

A keeper structure unitary with the housing holds the eyeglasses in position relative to the housing. The keeper structure includes a pair of bottom walls connected to and extending laterally outwardly relative to the wearer from the housing lower portion on opposed sides of the nose cavity for supporting the rim bottom sides of the two lens rims of the eyeglasses. The keeper structure includes a bracing wall positioned on the front side of the housing and that extends laterally outwardly relative to the housing. The bracing wall includes a pair of bracing surfaces that face inwardly relative to the wearer laterally beyond the housing. The bracing surfaces extend perpendicular relative to the pair of bottom walls. A pair of biasable fingers extend upwardly from the pair of bottom walls at the housing rear side generally lateral to the bracing surfaces on opposed sides of the nose cavity and are spaced from the bracing surfaces so as to define a pair of slots for receiving the pair of lenses of the eyeglasses.

The present invention can be better understood and the objects and important features, other than those specifically set forth above, will become apparent when consideration is given to the following details and description, which when taken in conjunction with the annexed drawings, describes, discloses, illustrates, and shows preferred embodiments or modifications of the present invention and what is presently considered and believed to be the best mode of practice in the principles thereof.

A BRIEF STATEMENT OF THE FIGURES

FIG. 2 is a rear elevational view of the device taken through plane 2—2 in FIG. 1;

FIG. 3 is a side elevational view of the device taken through plane 3—3 in FIG. 1;

FIG. 4 is a top view of the device taken through plane 4—4 in FIG. 1;

FIG. 5 is a front elevational view of the device taken through plane 5—5 in FIG. 1; and FIG. 6 is a center sectional view of the device taken through plane 6—6 in FIG. 1.

DETAILED DESCRIPTION OF THE PREFERRED EMBODIMENT

Figure 1:
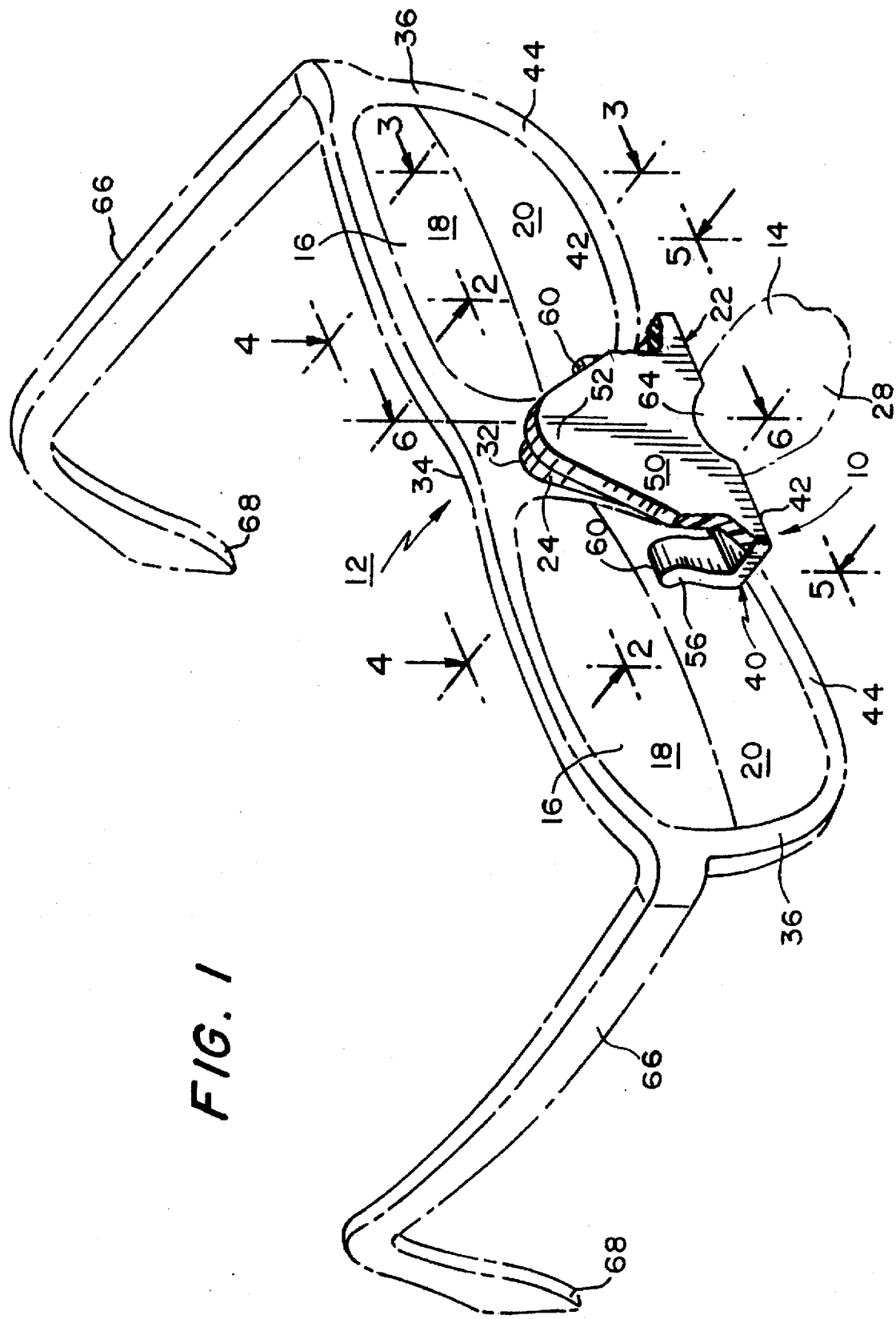
FIG. 1 is a perspective view of the focusing device in accordance with the present invention mounted upon the nose (shown in phantom line) of a wearer of the eyeglasses including a pair of bifocal eyeglasses (shown in phantom line) mounted upon the device.

Reference is now made in detail to the drawings wherein the same numerals refer to the same or similar elements throughout.

In accordance with the present invention, a focusing device 10 is illustrated in FIG. 1 for a pair of eyeglasses 12 shown in phantom line positioned on the nose 14 of a wearer, also shown in phantom line. Eyeglasses 12 are provided with a pair of bifocal lenses 16 having lens upper parts 18 either corrected for far vision or uncorrected and lens lower parts 20 corrected for near vision.

Focusing device 10 includes a support body 22 that includes a housing 24 that defines a cavity 26, seen in FIGS. 2 and 6, that receives the upper nose 28 of nose 14. Housing 24 includes a convex surface 30 that supports the bridge 34 of the lens rims 36 together with the inner sides of lens rims 36 of bifocal lenses 16 of eyeglasses 12. Convex surface 30 has an apex 32 that is positioned directly above cavity 26 at a distance 38, which is generally approximately one inch, as seen in FIGS. 1, 2, and 5. Bifocal lenses 16 of eyeglasses 12 are raised by distance 38 relative to the eyes of the wearer so that bifocal lenses 16 are raised at such distance 38 to the eyes of the wearer of the eyeglasses so that when the sight lines of the wearer are directed in a generally horizontal direction, the sight lines are aligned through lens lower parts A keeper structure 40 connected to housing 24 holds eyeglasses 12 in position relative to housing 24. A pair of bottom walls 42 extend laterally outwardly from the lower portion of housing 24 on opposed sides of cavity 26 support the rim bottom sides 44. When the head of the wearer is raised so that the sight lines of the wearer are generally horizontal, bottom walls 42 are also generally horizontal. Housing 24 includes housing front and rear sides 46 and 48, respectively, relative to the head of the wearer. Keeper structure 40 includes a bracing wall 50 that is connected to and extends upwardly from and generally perpendicular to bottom walls 42 along housing front side 46. Bracing wall 50 extends above apex 32 of convex surface 30 of housing 24 so as to provide a stop 52 that prevents lens rim bridge 34 of eyeglasses 12 from forward movement relative to housing 24. Bracing wall 50 extends beyond housing 24 leaving open a pair of bracing surfaces 54 positioned on opposed sides of housing 24 that face rearwardly toward housing rear side 48.

Keeper structure 40 further includes a pair of fingers 56 that are connected to and extend upwardly from each of pair of bottom walls 42 generally lateral to bracing wall 50 on opposed sides of cavity 26 at housing rear side 48. Fingers 56 are spaced from bracing wall 50, particularly from pair of bracing surfaces 54 so as to define a pair of slots 58, seen in FIGS. 3, 4, and 5, for receiving bifocal lenses 16 of eyeglasses 12.

Support body 22 including housing 24 is preferably made of a plastic material including fingers 56, which are biasable. Fingers 56 include finger upper portions 60, which are convexly curved relative to bracing wall 50. Finger upper portions 60 are spaced from bracing wall 50 defining a pair of slots 58 having widths that are slightly less than the thickness of bifocal lenses 16 of eyeglasses 12, so that fingers 56 are pressed apart slightly from unbiased modes into biased modes when lens rims 36 and bifocal lenses 16 are slid into slots 58 when eyeglasses 12 are mounted onto focal device 10, and finger upper portions 60 are thereupon pressed against the inner surface of bifocal lenses 16 so that eyeglasses 12 are held in a gripped position. In particular, fingers 56 are movable between unbiased and biased modes, wherein in the unbiased mode finger upper portions 60 are spaced at a first distance from bracing wall 50 and in the biased mode finger upper portions 60 are spaced from bracing wall 50 at a second distance that is greater than the first distance. Biasable fingers 56 are in the unbiased mode when eyeglass lenses 16 are not mounted to housing 24; and biasable fingers 56 are in the biased mode when eyeglass lenses 16 are mounted to housing 24 and positioned in said slot means. Also, both fingers 56 prevent movement of eyeglasses 12 inwardly relative to the housing 24. When eyeglasses 12 are removed from slots 58, Finger upper portions 60 self-bias back into their unbiased modes.

Cavity 26 defines an elongated inner matrix 64 that is generally configured to receive upper nose 28 of nose 14. Cavity 26 including matrix 64 extends upwardly from housing front side 46 to housing rear side 46 of housing 24. Cavity 26 further includes bracing wall 50 defining an aperture 62 at housing front side 46 of bracing wall 50 generally configured in the outline of upper nose 28 of nose 14.

Focusing device 10 and eyeglasses 12 are held in position by a mutual positioning relationship. That is, eyeglasses 10 are prevented from lateral movement relative to the eyes of the wearer by the positioning of lens rim bridge 34 upon convex surface 30 of housing 24. Eyeglasses 10 are prevented from forward movement relative to housing 24 by stop 52 at convex surface 30. Also, both eyeglasses 12 and focusing device 10 are prevented by temples 66 from lateral movement relative to the head of the wearer when glasses 12 are mounted to the head and over the ears of the wearer. Also, both focusing device 10 and eyeglasses 12 are prevented from forward movement relative to the head of the wearer when ear pieces 68 of temples 66 are placed behind the ears of the wearer. Eyeglasses 12 also creates a mutual positioning relationship with focusing device 10 by way of bifocal lenses 16 being gripped between fingers 56 and bracing wall 50 in pair of slots 58, and by way of each of lens rims 36 resting upon each of bottom walls 42, and by way of lens rim bridge 34 and lens rims 36 being held in position upon convex surface 30. Thus, eyeglasses 12 and focusing device 10 are held as a unit upon the head of the wearer.

Although the present device has been described in some detail by way of illustration and example for purposes of clarity and understanding, it will, of course, be understood that various changes and modifications may be made in the form, details, and arrangements of the parts without departing from the scope of the invention as set forth in the following claims.

What is claimed is:

1. A focusing device, for use with eyeglasses having bifocal lenses with a pair of lens rims, positioned on the upper nose area of a wearer's nose, where the lower parts of said bifocal lenses are corrected for near vision, comprising:

a housing defining a cavity for receiving said upper nose of the wearer of the eyeglasses, and having front and rear sides relative to said wearer;

said housing further having a lower housing portion, and including a convex surface for supporting a lens rim bridge and both inner sides of said pair of lens rims;

said convex surface having an apex that is positioned directly above said cavity at a predetermined distance of about one inch, and a keeper for holding said eyeglasses in position relative to said housing, said keeper being connected to said housing, and including a bracing wall connected to said front side of housing and extending generally perpendicular to said pair of bottom walls; connected to and extending laterally outwardly from said housing's lower portion on opposed sides of said cavity;

whereby when said eyeglass lenses are raised by said predetermined one inch distance relative to the eyes of the wearer, the sight lines of the wearer are directed in a generally horizontal direction and are aligned through said lower parts of said bifocal lenses.

2. The device according to claim 1, wherein said cavity includes said bracing wall defining an aperture configured in the outline of said upper nose; and a convex surface of said housing including an apex.

3. The device according to claim 2, wherein said bracing wall extends above said convex surface so as to define a stop for preventing a bridge of said eyeglasses from moving forward relative to said housing.

4. The device according to claim 2, wherein said bracing wall extends beyond said housing so as to form a pair of bracing surfaces positioned on opposed sides of said housing.

5. The device according to claim 4, wherein said keeper further includes a pair of fingers connected to and extending upwardly from said bottom walls generally lateral to said bracing wall on opposed sides of said cavity at said rear side of said housing, and said pair of fingers being spaced from said pair of bracing surfaces.

6. The device according to claim 5, wherein said pair of fingers are made of a biasable material, said biasable fingers having finger upper and lower portions, and said finger upper portions being convexly curved relative to said bracing wall.

7. The device according to claim 6 wherein said biasable fingers are movable between unbiased and biased modes, wherein in the unbiased mode said biasable fingers are spaced at a first distance from said bracing wall and in said biased mode said biasable fingers are spaced at a second distance from said bracing wall that is greater than said first distance, the biasable fingers being in the unbiased mode when the eyeglass lenses are not mounted to said housing, and the biasable fingers being in the biased mode when the eyeglass lenses are mounted to said housing and positioned in a slot formed between said bracing wall and said biasable fingers.

8. The device according to claim 1, wherein said cavity includes said housing defining an elongated matrix configured as the upper nose, and said matrix extending upwardly from said front side to said rear side of said housing.

* * * * *